: 3,051,575
Patented Aug. 28, 1962

3,051,575
METHOD OF PREPARING STABLE EGG-IMPREGNATED GREEN COFFEE

Fletcher A. Chase, Morris Plains, N.J., assignor to North Woods Coffee Company, a corporation of Illinois
No Drawing. Filed Sept. 21, 1959, Ser. No. 841,031
5 Claims. (Cl. 99—65)

This invention relates to a process for producing a stable egg-impregnated green coffee. The process is useful in preparing egg coffee commercially so the housewife can buy the premixed preparation instead of having to mix the egg with the ground coffee during the brewing process. One of the problems in preparing coffee beans in admixture with whole fresh eggs is that the egg, after drying, forms a brittle coating over the beans which chips off during the ordinary methods of cleaning, roasting and grinding. It is essential in producing a quality egg-coffee composition that the egg be dispersed homogeneously throughout the coffee. Another problem is to prevent deterioration of the egg during processing and prior to packaging so the egg retains its ability to impart improved flavor and body to the coffee which is finally brewed from the treated beans.

The primary object of the present invention is to provide a process in which both of these problems are solved. I have found that this object may be achieved by causing the egg to be absorbed into the green coffee bean.

The process broadly involves the steps of drying the green coffee as received to reduce its moisture content to less than 8%, mixing homogenized whole fresh eggs with the dried beans, and then drying the mixture under carefully controlled conditions to form the egg-impregnated coffee beans. The beans thus treated may then be roasted and ground in accordance with conventional practice. The roasted and ground beans are brewed in the usual fashion to obtain a fine coffee extract.

It is essential to the success of the present process that the green coffee beans be dried, at least to a moisture content of less than 8% and preferably below about 2%, prior to mixing with the whole eggs. It is also important that the whole eggs be very carefully homogenized so that a minimum amount of air is whipped into them, since the presence of oxygen will accelerate deterioration of fresh eggs. Also, the eggs should be maintained at relatively low temperatures during the homogenizing step for the same reason.

I have found that when the homogenized eggs are mixed with these dried coffee beans the egg is absorbed into the bean and this prevents the egg from deteriorating during subsequent processing steps. Although I do not want to be bound by any theory of operation of the invention, it appears that the coffee beans contain certain natural stabilizing compounds for the egg. When the egg is merely adhered to the surface of the bean there is no intimate contact between the egg and these stabilizing compounds and as a result the product does not have the stability which is required for a commercial product.

The following specific example will illustrate the practice of the invention: Seventy pounds of green coffee beans having a moisture content of from 12% to 14% are dried to reduce the moisture content to about 2%. Fifteen pounds of whole, fresh eggs are homogenized using a propeller-type mixed. This mixing operation takes about two minutes. Ice crystals are present in the eggs to prevent deterioration. Care must be taken not to whip the eggs. Whipping incorporates air which accelerates deterioration or spoilage of the eggs. The dried coffee beans and the homogenized eggs are poured together into a stainless steel container and mixed with a Hobart mixer for from 5 to 10 minutes. The green coffee beans flow rather readily before coming in contact with the egg. After having been coated with egg they have a tendency to stick together but as the mixing proceeds, the egg is absorbed into the coffee beans and the fluidity of the beans ultimately reaches approximately the original state. When the mass loses its gummy consistency and reverts to the state of free flowing beans, the absorption process has been completed. The beans are then spread on stainless steel or aluminum pans to a depth of approximately 1½ inches and dried at a temperature such that the surface of the beans does not exceed 220° F. The actual air temperature passing over the surface of the beans may be in the range of 400° to 425° F. and at this temperature approximately four hours are required to dry the beans. Any other convenient means for drying may be employed so long as the maximum temperature limit is observed.

The egg-impregnated beans may be admixed with a quantity of untreated green beans to reduce the total quantity of egg in the final product to the desired value. By mixing a relatively high proportion of egg with the beans the necessity of handling large quantities of beans is avoided and the size of the equipment may be reduced correspondingly. The eggs comprise about 21% of the total weight of the treated mixture. Usually sufficient untreated green beans are added to reduce the 21% to from 1% to 6% on the wet basis. In other words, up to eighty pounds of untreated green beans may be added. Depending upon the source and character of the green coffee, the maximum quantity of egg absorbed will range up to, say 30% by weight.

The final drying step may be carried out at a temperature between 170° to 220° F. on the surface of the beans and sufficient time is allowed to produce a finished moisture content in the egg-treated green bean not in excess of 2%. This is an essential consideration in the present process. I have found that if the moisture content is significantly above 2%, the stability of the finished product will be impaired.

Coffee prepared in accordance with this process is ground and roasted following conventional practice. The presence of the egg produces a greatly improved coffee extract comparable only to that heretofore made by housewives who added egg directly to the coffee before the brewing thereof. It is suspected that the fat of the egg mixes with the fat of the coffee to produce a homogeneous flavor alteration which is manifested in smoother and richer flavor than that resulting in a brew made from the same coffee without the egg.

What I claim as new and desire to secure by Letters Patent of the United States is:

1. A method for preparing stable egg-impregnated green coffee which comprises drying green coffee beans to a moisture content of less than 8%, adding to said beans the equivalent on the wet basis of about 1% to 6% of homogenized whole eggs, mixing until all of the egg has been absorbed by the beans and drying the mixture at a temperature which maintains the surface of the beans at 170° to 220° F. for a period of time sufficient to reduce the moisture content in the green egg-containing beans to less than about 2%, said percentages being by weight.

2. A method for preparing stable egg-impregnated green coffee which comprises drying green coffee beans to a moisture content of less than 8%, adding about 20% of homogenized whole eggs to the green coffee beans based upon the total weight of the egg-coffee mixture, mixing the beans and the eggs until all of the egg has been absorbed by the beans, drying the mixture at a temperature which maintains the surface of the beans at 170° to 220° F. for a period of time sufficient to reduce the moisture content to less than 2%, and admixing the green beans thus treated with a quantity of untreated green beans sufficient to produce a product containing from 1% to 6% of egg on the wet basis, said percentages being by weight.

3. A method for preparing stable egg-impregnated green coffee which comprises drying green coffee beans to a moisture content of about 2%, adding the equivalent on the wet basis of about 1% to 6% of cold homogenized whole eggs to the beans, mixing until all of the egg has been absorbed into the beans and drying the mixture at a temperature of 170° to 220° F. for a period of time sufficient to reduce the moisture content of the green beans to less than 2%, said percentages being by weight.

4. A method for preparing stable egg-impregnated green coffee which comprises drying green coffee beans to a moisture content of less than 8%, mixing from 80% to 70% of said beans with from 20% to 30% of homogenized whole eggs until all of the egg has been absorbed by the beans, drying the mixture at a temperature which maintains the surface of the beans at 170° to 220° F. for a period of time sufficient to reduce the moisture content of the green beans to less than about 2%, roasting the product thus formed, and grinding the roasted product.

5. The method of claim 2 in which the coffee mixture is roasted and ground to provide a homogeneous coffee product.

References Cited in the file of this patent
UNITED STATES PATENTS
2,911,320    Chase et al. _____ Nov. 3, 1959